(12) United States Patent
Ayazi et al.

(10) Patent No.: US 9,726,489 B2
(45) Date of Patent: Aug. 8, 2017

(54) MODE-MATCHED SINGLE PROOF-MASS DUAL-AXIS GYROSCOPE AND METHOD OF FABRICATION

(75) Inventors: Farrokh Ayazi, Atlanta, GA (US);
Wang-kyung Sung, Atlanta, GA (US);
Mohammad Zaman, Worcester, MA (US)

(73) Assignee: Georgia Tech Research Corporation, Atlanta, GA (US)

(*) Notice: Subject to any disclaimer, the term of this patent is extended or adjusted under 35 U.S.C. 154(b) by 382 days.

(21) Appl. No.: 13/991,672

(22) PCT Filed: Dec. 5, 2011

(86) PCT No.: PCT/US2011/063315
§ 371 (c)(1),
(2), (4) Date: Jul. 12, 2013

(87) PCT Pub. No.: WO2012/078520
PCT Pub. Date: Jun. 14, 2012

(65) Prior Publication Data
US 2013/0283911 A1    Oct. 31, 2013

Related U.S. Application Data

(60) Provisional application No. 61/420,434, filed on Dec. 7, 2010.

(51) Int. Cl.
*G01C 19/56*     (2012.01)
*G01C 19/5684*   (2012.01)
*G01C 25/00*     (2006.01)

(52) U.S. Cl.
CPC ......... *G01C 19/56* (2013.01); *G01C 19/5684* (2013.01); *G01C 25/00* (2013.01); *Y10T 29/49117* (2015.01)

(58) Field of Classification Search
CPC ................... Y10T 29/49117; G01C 19/56
(Continued)

(56) References Cited

U.S. PATENT DOCUMENTS 5,249,465 A * 10/1993 Bennett ................. G01P 15/131
73/510
5,783,749 A     7/1998 Lee et al.
(Continued)

OTHER PUBLICATIONS

Notification Concerning Transmittal of International Preliminary Report on Patentability dated Jun. 20, 2013 in PCT/US2011/063315.

*Primary Examiner* — Michael A Lyons
*Assistant Examiner* — Suman K Nath
(74) *Attorney, Agent, or Firm* — Burns & Levinson LLP; Bruce D. Jobse

(57) ABSTRACT

A single proof-mass, dual-axis gyroscope apparatus comprises a resonating body member and first and second electrodes each capacitively coupled to the resonating body member by a respective lateral capacitive air gap and a vertical capacitive air gap. The width of one of the lateral capacitive air gap of the first electrode is substantially smaller than the vertical capacitive air gap. The width of one of the vertical capacitive air gap of the second electrode is substantially smaller than the lateral capacitive air gap. The apparatus claimed can address the process variation such as vertical and lateral dimension variation by electrostatic tuning method.

37 Claims, 17 Drawing Sheets

(58) Field of Classification Search
USPC .......................... 73/504.02, 504.14, 504.16
See application file for complete search history.

(56) References Cited

U.S. PATENT DOCUMENTS

| | | | | |
|---|---|---|---|---|
| 6,296,779 | B1* | 10/2001 | Clark et al. ................. | 73/504.16 |
| 6,481,285 | B1* | 11/2002 | Shkel ................. | G01C 19/5719 |
| | | | | 73/504.13 |
| 7,225,674 | B2* | 6/2007 | Clark ......................... | 73/514.32 |
| 7,543,496 | B2* | 6/2009 | Ayazi ................. | G01C 19/5698 |
| | | | | 73/504.01 |
| 2008/0054759 | A1* | 3/2008 | Ayazi .................... | B81C 1/0023 |
| | | | | 310/309 |
| 2008/0295622 | A1 | 12/2008 | Challoner | |
| 2008/0314147 | A1* | 12/2008 | Nasiri et al. ................ | 73/514.32 |
| 2009/0266162 | A1* | 10/2009 | Ayazi ................. | G01C 19/5698 |
| | | | | 73/504.12 |
| 2014/0230547 | A1* | 8/2014 | El-Gamal .......... | G01C 19/5698 |
| | | | | 73/504.12 |

\* cited by examiner

MODE-MATCHED SINGLE PROOF-MASS DUAL-AXIS GYROSCOPE AND METHOD OF FABRICATION

This is a U.S. national phase application and claims priority to International Application No. PCT/US2011/063315, filed on Dec. 5, 2011, the entire contents of which are incorporated herein by reference.

FIELD OF THE INVENTION

The present disclosure relates to dual-axis gyroscopes, and, more specifically, to mode-matched single proof-mass dual-axis gyroscopes.

BACKGROUND OF THE INVENTION

Tri-axial gyroscopes are increasingly used in handheld devices, such as mobile phones, personal navigation aids, smart user interfaces and gaming controllers that require multi-dimensional motion recognition for accurate positioning. A majority of state-of-the-art vibratory gyroscopes utilize separate proof masses for each axis' rate measurement. Having separate proof masses for each axis' rate measurement increases the size and mass of a vibratory gyroscope. Although efforts have been made to reduce the size and mass of a vibratory gyroscope, there is an continual desire to make vibratory gyroscopes smaller and lighter.

Accordingly, there is a need for vibratory gyroscopes solutions that do not require separate proof masses for each axis' rate measurement.

SUMMARY OF THE INVENTION

The present disclosure is directed towards the design, fabrication, and characterization of a high-frequency single proof-mass dual-axis gyroscope. The disclosed hollow-disk pitch-and-roll gyroscope, which is generally referred to herein as annulus gyroscope, operates under mode-matched condition with a combination of in-plane and out-of-plane resonance modes of an annulus structure which occur at approximately 900 kHz. The dual-axis gyroscope has control electrodes that enable electrostatic frequency tuning of the in-plane and out-of-plane resonance modes to achieve mode-matching (i.e. frequency split of 0 Hz) in the presence of process non-idealities such as thickness and lateral dimension variations of the substrates such as Silicon-on-Insulator (SOI) wafer or single crystal Silicon (SCS) wafer. According to embodiments, the device can demonstrate x- and y-axis rate sensitivity of 127 µV/deg/sec and 214 µV/deg/sec, respectively. High quality factors (Q) of approximately 10,000 can be observed in vacuum for the in-plane drive and out-of-plane sense resonance modes. The device is implemented using a modified version of the high aspect-ratio combined poly- and single-crystal silicon micromachining (HARPSS) process, thereby enabling a single-chip tri-axial implementation when integrated with a yaw disk gyroscope.

According to one aspect of the present disclosure, a single proof-mass dual-axis gyroscope apparatus comprises a resonating body member, at least one first electrode and at least one second electrode. According to embodiments, the resonating body member has a top surface and a side surface. The top surface of the resonating body member is separated from the first electrode by a first vertical capacitive air gap and the side surface of the resonating body member is separated from the first electrode by a first lateral capacitive air gap. The first vertical capacitive air gap is substantially larger than the first lateral capacitive air gap. Moreover, the top surface of the resonating body member is separated from the second electrode by a second vertical capacitive air gap and side surface of the resonating body member is separated from the second electrode by a second lateral capacitive air gap. The second vertical capacitive air gap is substantially smaller than the second lateral capacitive air gap. The first vertical capacitive air gap and the second lateral capacitive air gap may be approximately 5 µm. The first lateral capacitive air gap may be approximately 200 nm, and the second vertical capacitive air gap may be approximately 300 nm.

According to another aspect, a method of fabricating a single proof-mass dual-axis gyroscope apparatus comprises forming a resonating body member having a top surface and a side surface. A side electrode is formed that is separated from a side surface of the resonating body member by a first lateral capacitive air gap substantially smaller than a first vertical capacitive air gap. A top electrode is formed that is separated from the top surface of the resonating body member by a second vertical capacitive air gap substantially smaller than a second lateral capacitive air gap.

According to another aspect, a single proof-mass, dual-axis gyroscope apparatus comprises a resonating body member and first and second electrodes each capacitively coupled to the resonating body member by a respective lateral capacitive air gap and a vertical capacitive air gap. The width of one of the lateral capacitive air gap of the first electrode is smaller than the width of one of the vertical capacitive air gap of the first electrode. Similarly, the width of one of the vertical capacitive air gap of the second electrode is smaller than the width of one of the lateral capacitive air gap of the second electrode. The first and second electrodes can be defined at the same location by introducing isolation layer in between.

According to yet another aspect, a single proof-mass dual-axis gyroscope apparatus comprises a resonating body member and a plurality of electrodes each capacitively coupled to the resonating body member by a lateral capacitive air gap and a vertical capacitive air gap.

BRIEF DESCRIPTION OF THE DRAWINGS

The present disclosure is illustratively shown and described in reference to the accompanying drawing in which:

FIGS. 15E, 15F, and 15G are m=2, 3, and 4 in-plane modes, respectively.

DETAILED DESCRIPTION

Technologies herein are directed towards the design, fabrication, and characterization of a single proof-mass dual-axis gyroscope device for simultaneous dual-axis pitch and roll rate sensing, e.g. x-axis and y-axis. The gyroscope operates at a frequency that is typically one to three orders of magnitude higher than existing gyroscopes. This high frequency of operation and high quality factor of the device reduces the Brownian noise floor to several orders of magnitude less than its low frequency counterparts, allowing the device to maintain a high resolution while maintaining an operational bandwidth approaching and exceeding 100 Hz. The disclosed device can employ a combination of one in-plane and two out-of-plane resonance modes or two in-plane and one out-of-plane resonance modes for increased sensitivity. These resonance modes are mode-matched at approximately the same frequency. To realize a high manufacturing yield in the presence of process variations, the disclosed device can retain wide-frequency tunability for each resonance mode. A modified version of the high aspect-ratio combined poly- and single-crystal silicon micromachining (HARPSS) process is utilized to broaden and enhance the device frequency tunability, improve signal isolation between in-plane drive and out-of-plane sense resonance modes, and minimize the magnitude of the quadrature signal component fed through to the sense electrodes.

The present disclosure will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure.

Figure 1:
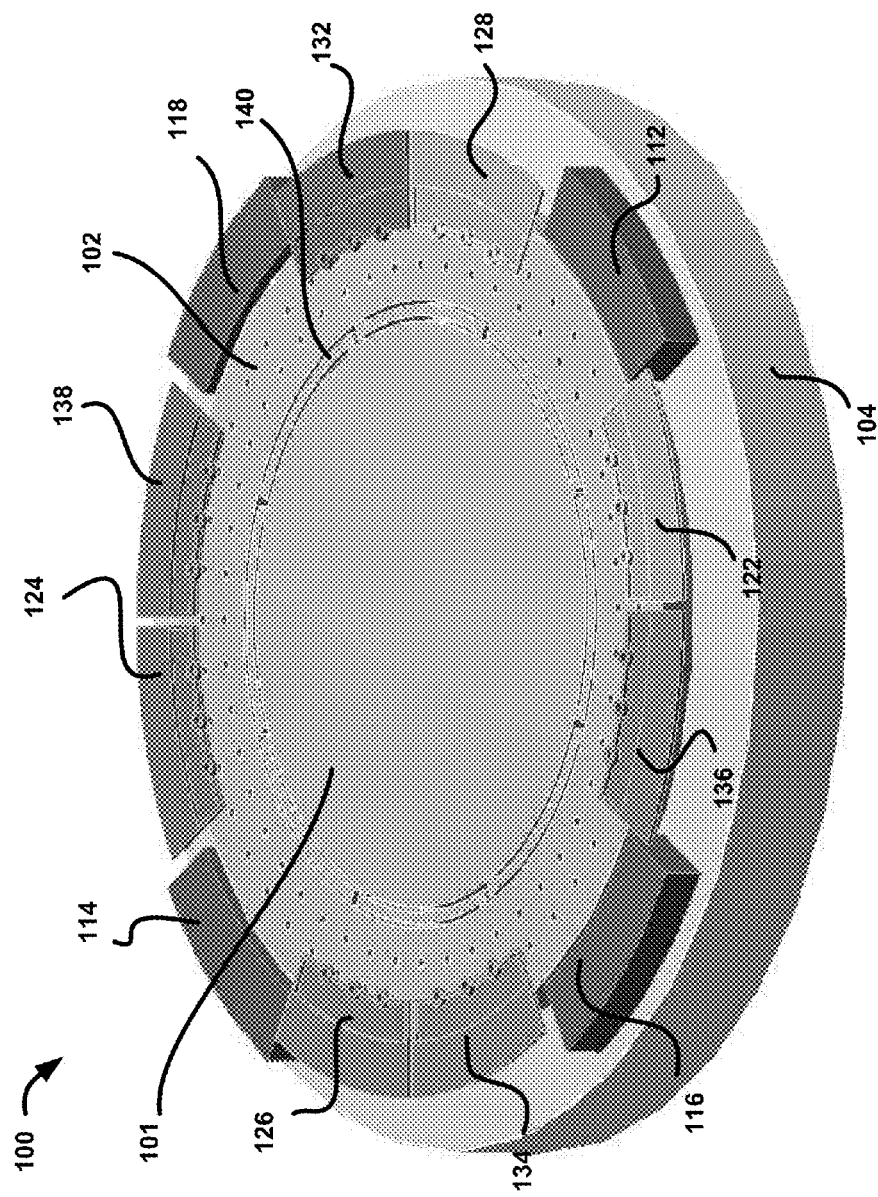
FIG. 1 illustrates a perspective view of a single proof-mass, dual-axis gyroscope according to various embodiments of the present disclosure.

Referring now to the drawings, FIG. 1 illustrates a perspective view of a single proof-mass dual-axis gyroscope according to embodiments of the present disclosure. As shown in FIG. 1, the single proof-mass dual-axis gyroscope apparatus 100 may include a central structure 101 connected to a resonator body 102 by support structures 140. In various embodiments, the resonator body 102 may be suspended or supported by the support structures 140, which may be beam-shaped structures. The central structure 101 may be configured to act as a support anchor and location for applying a polarization bias voltage. In some embodiments, the central structure 101 provides a connection pad for a polarization DC voltage to bias the resonator body 102 by either positive or negative DC voltage. Although the resonator body 102 is configured to resonate, the central structure 101 may not resonate during operation.

The resonator body 102 may be an annulus sized to surround the central structure 101. In some embodiments, the annulus may be a circular or periodically repeated structure with respect to its axis of symmetry. The support structures 140, which connect the resonating body 102 to the central structure 101 may have no limitation in the aspect ratio. Further, perforations in the support structures 140, as shown in FIG. 1, may or may not be introduced depending on the fabrication process. Additionally, the gyroscope may be operated at resonance frequencies higher than 100 kHz, which can reach resonance frequencies 10 MHz depending on the radial dimension and thickness of the resonating body 102. The resonator body 102 may further include in plane resonance modes and out of plane resonance modes that are approximately the same value.

The resonator body 102 may be formed from silicon, polysilicon, metals, piezoelectric materials, polymers, or any combination of them. In various embodiments, the resonator body 102 has a top surface, a bottom surface, and a side surface that extends around the periphery of the resonator body 102. In some embodiments, the resonator body 102 may be an annulus or a polygon. The resonator 102 may be hollow or solid and in some embodiments, the resonator body 102 may be supported by a handle layer 104 of a silicon-on-insulator substrate or single crystal silicon substrate.

To realize dual-axis rate sensitivity, the single proof-mass dual-axis gyroscope apparatus 100 is designed to utilize an in-plane elliptical drive mode and two orthogonal out-of-plane sense modes, referred to herein as the x-axis and y-axis modes, respectively. In order to sense simultaneous dual-axis pitch and roll rate changes, at least one of anti-nodes aligned to the anti-nodes of at least one of x-axis and y-axis may be utilized. As such, even-numbered modes can be used for drive mode of dual-axis pitch and roll rate sensing or pitch and roll angle sensing. Accordingly, even-numbered modes, such as m=2, 4, 6, and the like, may be utilized as a drive mode. In various embodiments, the in-plane elliptical drive mode or wine glass mode can be utilized. In addition, the drive mode may be an out-of-plane mode and the sense modes may be in-plane modes. The in-plane elliptical drive mode can have multiples of four anti-nodes aligned in at least one of the +X, −X, +Y, −Y direction.

In various embodiments, the Si <100> substrate is utilized because of its periodic elasticity every 90 degrees. One in-plane mode can be aligned to the Si <100> direction and the other in-plane mode can be aligned to the Si <110> direction. These two modes may be 45 degrees apart from one another. In various embodiments, the in-plane mode aligned in the Si <100> direction can have a lower frequency than the other mode aligned in the Si <110> direction, thereby facilitating being mode-matched with other out-of-plane sense mode frequencies. In addition, the other driving in-plane mode aligned to Si <110> direction can also be used as a driving mode. It should be appreciated that other anisotropic substrates, including Si <110> substrate, may also be utilized. In addition, isotropic substrates, such as Si <111> substrate, can also be used when employing a proper quadrature error cancellation scheme.

The apparatus 100 may include a bottom support member (not shown) on which the device is placed, and plurality of electrodes. The apparatus 100 may be actuated from a drive-in electrode 112 located in the Si <100> direction of the substrate that is capacitively coupled to the side surface of the resonator body 102. A drive-out electrode 114 capacitively coupled to the side surface of the resonator body 102 is configured to monitor the in-plane drive output signal. The in-plane drive mode has anti-nodes aligned with the x-axis and y-axis. Applied pitch and roll rotation causes out-of-plane coupling, generating differential output currents by way of capacitive air gap changes at one or more sense electrodes capacitively coupled to the top surface of the resonator 102. The capacitive gap can be made from a nonconducting material, such as, air, epoxy, polymer, compound of silicon nitride and silicon dioxide, or any combination of them. For the differential sensing of output signals, four sense electrodes, including an $\Omega_x^-$ sense electrode 122, an $\Omega_x^+$ sense electrode 124, an $\Omega_y^-$ sense electrode 132 and an $\Omega_y^+$ sense electrode 134 are defined in such a manner that the electrodes may be proximate to an area on top of anti-nodes of the out-of-plane modes. Anti-nodes may be defined as points where the amplitude of displacement existing in a standing wave is at a maximum. In the illustrative embodiment, the anti-nodes of the out-of-plane modes are points where the mode has maximum displacement towards the +Z axis or −Z axis. The drive electrodes configured to actuate the resonator body 102 may be located in at least one of a <100> and a <110> direction of Silicon substrate when utilized by (100) Silicon substrate. However, when the device is made from (111) Silicon substrate, the actuating/detecting direction may not be restricted by anisotropy of Silicon orientation.

The single proof-mass dual-axis gyroscope apparatus 100 may further include drive tuning electrodes 116 and 118, $\Omega_x$ tuning electrodes 126 and 128 and $\Omega_y$ tuning electrodes 136 and 138. These tuning electrodes may be configured to shift the frequency of the modes. In various embodiments, the tuning electrodes are arranged at the anti-nodes of out-of-plane modes so as to tune the frequencies of modes using electrostatic tuning methods. Generally speaking, electrostatic tuning is based on the change in 'total stiffness' of the system by increasing 'electrical stiffness', and 'electrical stiffness change' by applying DC voltage difference has the maximum effect when the DC voltage is applied from the anti-nodes of the vibrating mode. As such, the tuning electrodes can be arranged at the anti-nodes of the corresponding resonant modes.

Figure 2A:
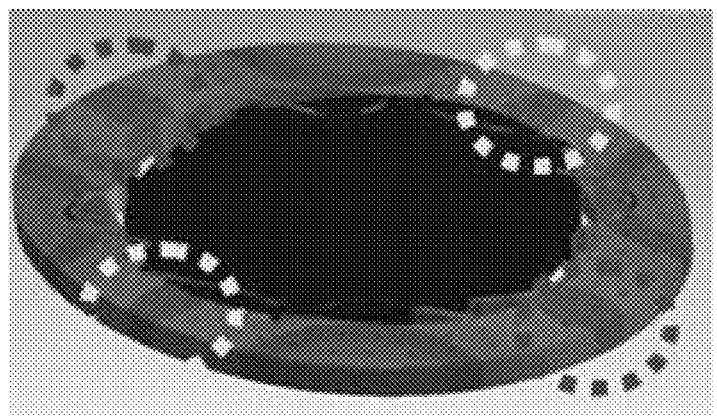
FIG. 2A illustrates an ANSYS simulation model of an in-plane drive resonance mode according to various embodiments of the present disclosure.
Figure 2B:
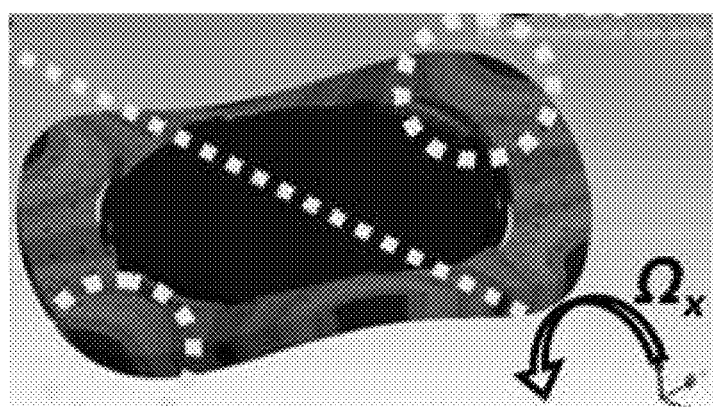
FIG. 2B illustrates an ANSYS simulation model of an out-of-plane x-axis sense resonance mode according to various embodiments of the present disclosure.
Figure 2C:
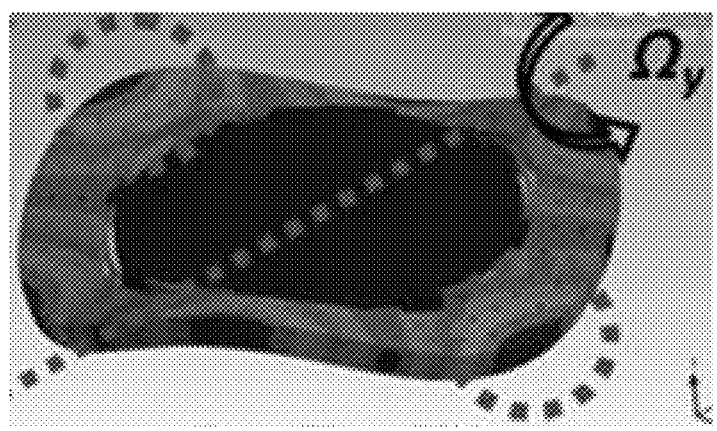
FIG. 2C illustrates an ANSYS simulation model of an out-of-plane y-axis sense resonance mode according to various embodiments of the present disclosure.

Referring now also to FIGS. 2A-C, the in-plane drive mode as shown in FIG. 2A has anti-nodes aligned with the x-axis and y-axis. FIG. 2B illustrates an ANSYS simulation model of out-of-plane x-axis sense resonance modes and FIG. 2C illustrates an ANSYS simulation model of out-of-plane y-axis sense resonance modes according to various embodiments of the present disclosure. Applied pitch and roll rotation causes out-of-plane coupling. For instance, input rotation rate from pitch-axis results in changes in both the vertical capacitive air gap between the top $\Omega_x^-$ sense electrode 122 and the resonator 102 and the vertical capacitive air gap between the top $\Omega_x^+$ sense electrode 124 and the resonator 102. As the capacitive air gaps change, differential output currents are generated at the top $\Omega_x^-$ sense electrode 122 and $\Omega_x^+$ sense electrode 124 while the top $\Omega_y^-$ sense electrode 132 and $\Omega_y^+$ sense electrode 134 do not generate output current by the input rotation rate from x-axis. Similarly, input rotation from roll-axis results in changes in both the vertical capacitive air gap between the top $\Omega_y^-$ sense electrode 132 and the resonator 102, and the top $\Omega_y^+$ sense electrode 134 and the resonator 102 while the top $\Omega_x^-$ sense electrode 122 and $\Omega_x^+$ sense electrode 124 do not generate output current by the input rotation rate from y-axis. Because the anti-nodes of the x-axis mode are aligned to nodes of the y-axis mode, and vice versa, the device results in inherently small cross-axis sensitivity.

The frequencies of the in-plane drive modes and out-of-plane sense modes are designed to match at a specific device dimension. However, in order to address variations in the thickness and lateral dimension of the substrates such as SOI wafer along with the inevitable process variations caused by imperfections in the fabrication process and its subsequent initial frequency split, the in-plane frequency tuning electrodes 116, 118 and out-of-plane frequency tuning electrodes 126, 128, 136, 138 are selectively-defined during the fabrication process. The two drive tuning electrodes 116, 118 located at the anti-nodes of the in-plane drive mode tune the drive mode frequency with minimal effect on the out-of-plane sense mode frequencies. For the out-of-plane sense mode tuning, the $\Omega_x$ tuning electrodes 126, 128 and $\Omega_y$ tuning electrodes 136, 138 may be arranged 90° apart to exert balanced electrostatic force. In various embodiments, frequency tuning is used for mode-matching or near-mode matching. At least one frequency tuning electrode may be separated from the resonating body 102 by a sub-micron transversal (or horizontal) capacitive dielectric gap at the anti-node(s) of in-plane driving mode of the resonating body 102, and at least one frequency tuning electrode may be separated from the resonating body 102 by sub-micron vertical capacitive dielectric gap at the anti-nodes of out-of-plane mode(s) of the resonating body 102. As described above, the frequency tuning is devised to address frequency split under the process variations in lateral/thickness bias and/or combination of them.

To tune each resonance mode with minimal interference between the modes, the size of the vertical capacitive air gaps and the lateral capacitive air gaps are carefully selected.

The top x-axis rate sensing and tuning electrodes 122, 124, 126, 128 and the y-axis rate sensing and tuning electrodes 132, 134, 136, 138, each have narrow vertical capacitive air gaps of approximately 300 nm with respect to the resonator 102. In various embodiments, the vertical capacitive air gaps can range between 50 nm and 5 μm. In addition, the top x-axis rate sensing and tuning electrodes 122, 124, 126, 128 and the y-axis rate sensing and tuning electrodes 132, 134, 136, 138 have relatively wide lateral air gap sizes of approximately 5 μm from the resonator 102. In various embodiments, the side air gaps at the top electrodes can range between 500 nm and 50 μm.

Figure 3B:
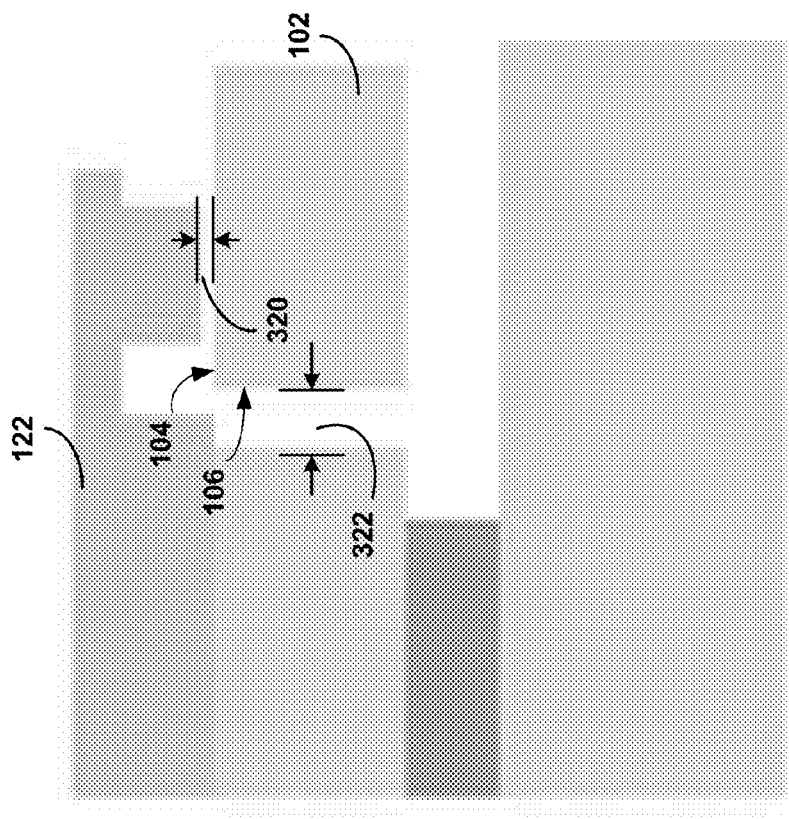
FIG. 3B illustrates an enlarged view of the top electrode separated from the resonator structure shown in FIG. 4D in accordance with embodiments of the present disclosure.
Figure 3A:
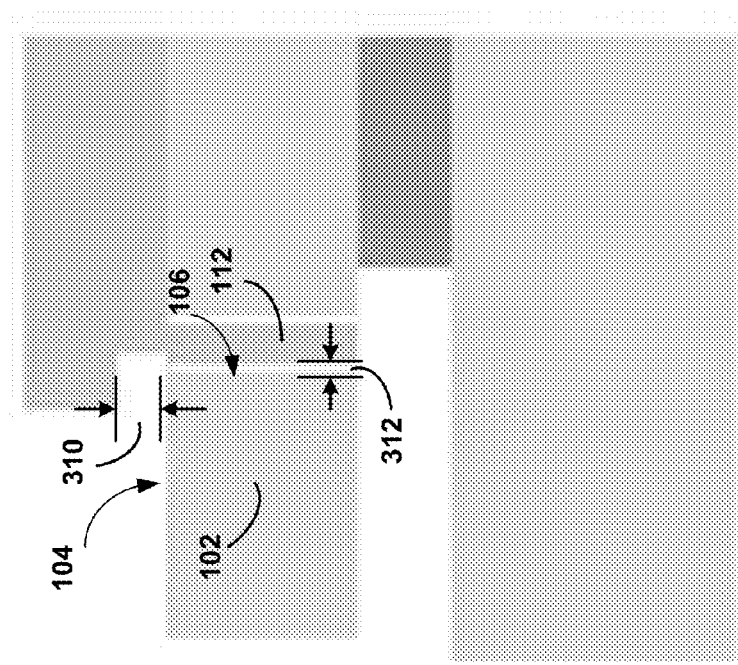
FIG. 3A illustrates an enlarged view of the side electrode separated from the resonator structure shown in FIG. 4D in accordance with embodiments of the present disclosure.

Referring now to FIG. 3A, an enlarged cross-sectional view of the resonator 102 and an exemplary side drive mode electrode, such as any of the drive-in electrode 112, the drive-out electrode 114, or the drive mode tuning electrodes 116, 118, is shown. The side electrode 112 is separated from the top surface 104 of the resonator 102 by a large vertical capacitive air gap 310 and from the side surface 106 of the resonator 102 by a relatively small lateral capacitive air gap 312. In various embodiments, the vertical capacitive air gap 310 is approximately 2 μm from the top surface 104 of the resonator 102. In various embodiments, the vertical capacitive air gap at side electrodes can range between 500 nm and 50 μm. The lateral capacitive air gap 312 is approximately 200 nm from the side surface 106 of the resonator 102. In various embodiments, the lateral capacitive air gap at side electrodes can range between 50 nm and 5 μm.

Similarly, FIG. 3B illustrates an enlarged view of the resonator 102 and an exemplary top electrode, such as any of the top electrodes 122, 124, 126, 128, 132, 134, 136, 138. The top electrode 122 is separated from the top surface 104 of the resonator 102 by a small vertical capacitive air gap 320 and from the side surface 106 of the resonator 102 by a relatively large lateral capacitive air gap 322. In various embodiments, the vertical capacitive air gap 320 is approximately 300 nm from the top surface 104 of the resonator 102. In various embodiments, the vertical capacitive air gap at the top electrodes can range between 50 nm and 5 μm. In addition, the lateral capacitive air gap 322 is approximately 5 μm from the side surface 106 of the resonator 102. In various embodiments, the lateral capacitive air gap at the top electrodes can range between 500 nm and 50 μm.

By having such significant capacitive air gap size differences between the lateral capacitive air gaps and the corresponding vertical capacitive air gaps, movements of the resonator 102 may only be detected along one axis, thereby minimizing cross-axis sensitivity. By taking advantage of the significant gap size difference, the sense tuning electrodes 126, 128, 136, 138, which have much smaller vertical capacitive air gaps than lateral capacitive air gaps, can tune the frequencies associated with out-of-plane modes with minimal interferences to the frequencies associated with in-plane modes. Similarly, the drive tuning electrodes 116, 118 have much smaller lateral capacitive air gaps 312 than vertical capacitive air gaps 310, thereby allowing the drive tuning electrodes 116, 118 to tune the frequencies associated with in-plane modes without causing an interference to the frequencies associated with out-of-plane modes.

It should be appreciated that the vertical capacitive air gaps between the top electrodes and the resonator of approximately 300 nm may allow the gyroscope apparatus 100 to handle a polarization voltage (Vp) larger than 5V DC. The number, width, spanned angle, and gap size of the tuning electrodes 116, 118, 126, 128, 136, 138 are optimized to achieve more than 12 kHz tunability to compensate for ±0.3 μm thickness variation with less than 30V DC voltage.

In addition, the selectively-defined electrode configuration of the sense electrodes 122, 124, 132, and 134 can reduce the in-plane drive mode quadrature component seen at the out-of-plane sensing electrodes. In some embodiments, the cross-axis sensitivity can be reduced by employing quadrature cancellation electrodes to align the anti-nodes of sense modes to the anti-nodes of drive mode. Due to fabrication process variations, the anti-nodes of out-of-plane modes may not be aligned with the anti-nodes of in-plane modes. The misalignment of the anti-nodes associated with the sense modes and the drive modes is the source of cross-axis sensitivity. Therefore, with the use of quadrature cancellation electrodes, the resonant modes may be aligned to the proper orientation using electrostatic force provided by the quadrature cancellation electrodes. In various embodiments, the driving mode excitation and sensing can be done piezoelectrically.

Currently, silicon resonators are primarily fabricated using the conventional HARPSS process to achieve very high aspect-ratio air-gaps for electrostatic transduction. In the conventional HARPSS process, trenches etched in silicon using the DRIE process to define the dimensions of the silicon bulk acoustic resonator, while a subsequent thermally grown silicon dioxide sacrificial layer defines the air-gap between the silicon bulk acoustic resonator and the drive/sense polysilicon electrodes.

Figure 4A:
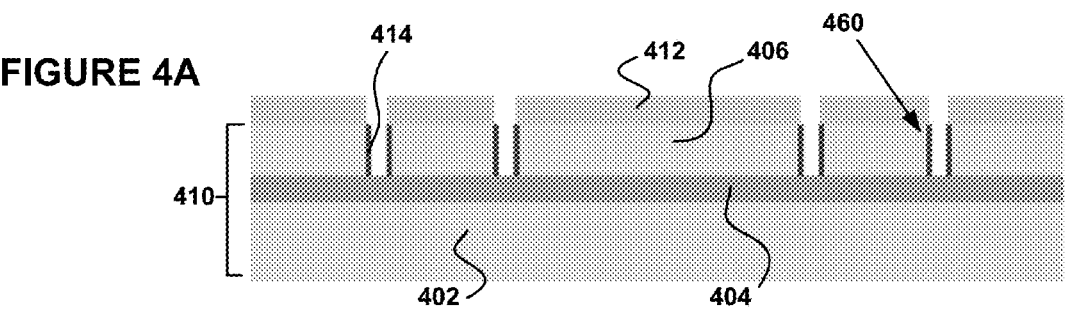
FIGS. 4A-D are a visual representation of a process of fabricating a dual-axis annulus gyroscope according to embodiments of the present disclosure.
Figure 4B:
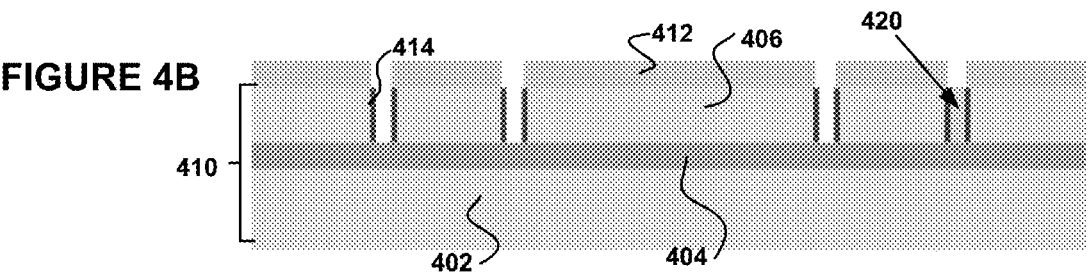

Referring now to FIGS. 4A-D, a visual representation of a process for fabricating a dual-axis annulus gyroscope 100 in accordance with various embodiments is shown. The process starts with creating and patterning an initial thick thermal oxide layer 412 on a Si <100> Silicon-on-Insulator substrate 410, as illustrated in FIG. 4A. The Silicon-on-Insulator substrate 410 may include a first silicon layer 402 separated from a second silicon layer 406 by a buried oxide layer 404. In one embodiment, the thickness of device layer 406 in Silicon-on-Insulator substrate 410 is approximately 41 μm thick. The second silicon layer 406 is etched through use of a thermal oxide mask 412, and a first Low-Pressure Chemical Vapor Deposition (LPCVD) Sacrificial Oxide (SACOX) layer 414 is deposited, as shown in FIG. 4A. In some embodiments, the first layer of sacrificial oxide can be approximately 200 nm thick.

A first polysilicon layer 420 may then be deposited after boron doping and etched back from the surface. For simplicity, the first polysilicon layer 420 may be deposited with in-situ doping. The trench-refilled first polysilicon layer 420 is etched from the area where the top electrodes are supposed to be defined, as shown by the gaps in FIG. 3B.

Figure 4C:
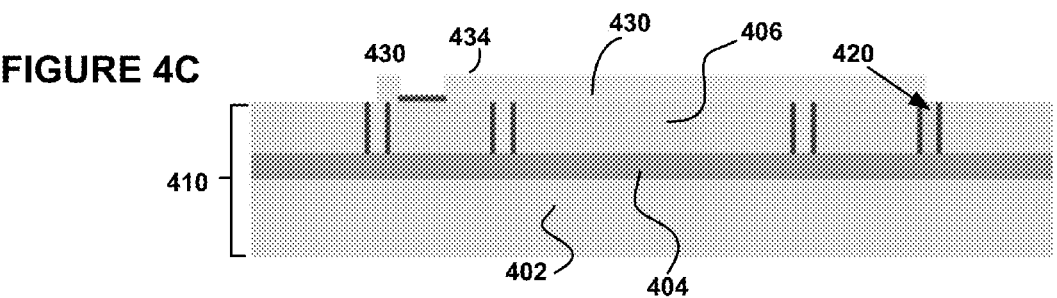
Figure 4D:
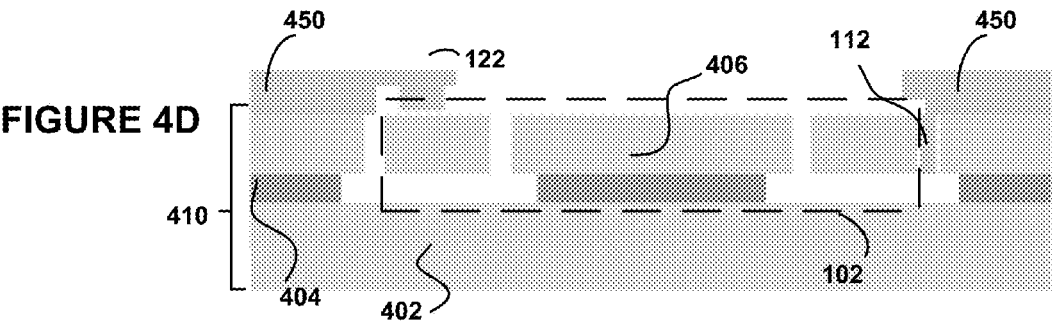

A 3 μm thick LPCVD oxide layer 430 is deposited to refill the empty trenches and patterned. A 300 nm thick second LPCVD SACOX layer 434 is deposited and patterned to create a narrow vertical capacitive air gap, as shown in FIG. 4C. The second polysilicon layer 450 may then be deposited, boron-doped, annealed and patterned to finalize the structure. The batch is finished by release in Hydrofluoric Acid with timed control, leaving both a vertical capacitive air gap between the top electrode, shown as top electrode 122, and the resonator 102 (outlined in phantom) and a lateral capacitive air gap between the side electrode, shown as drive electrode 112, and the resonator 102, as shown in FIG. 4D.

Figure 5:
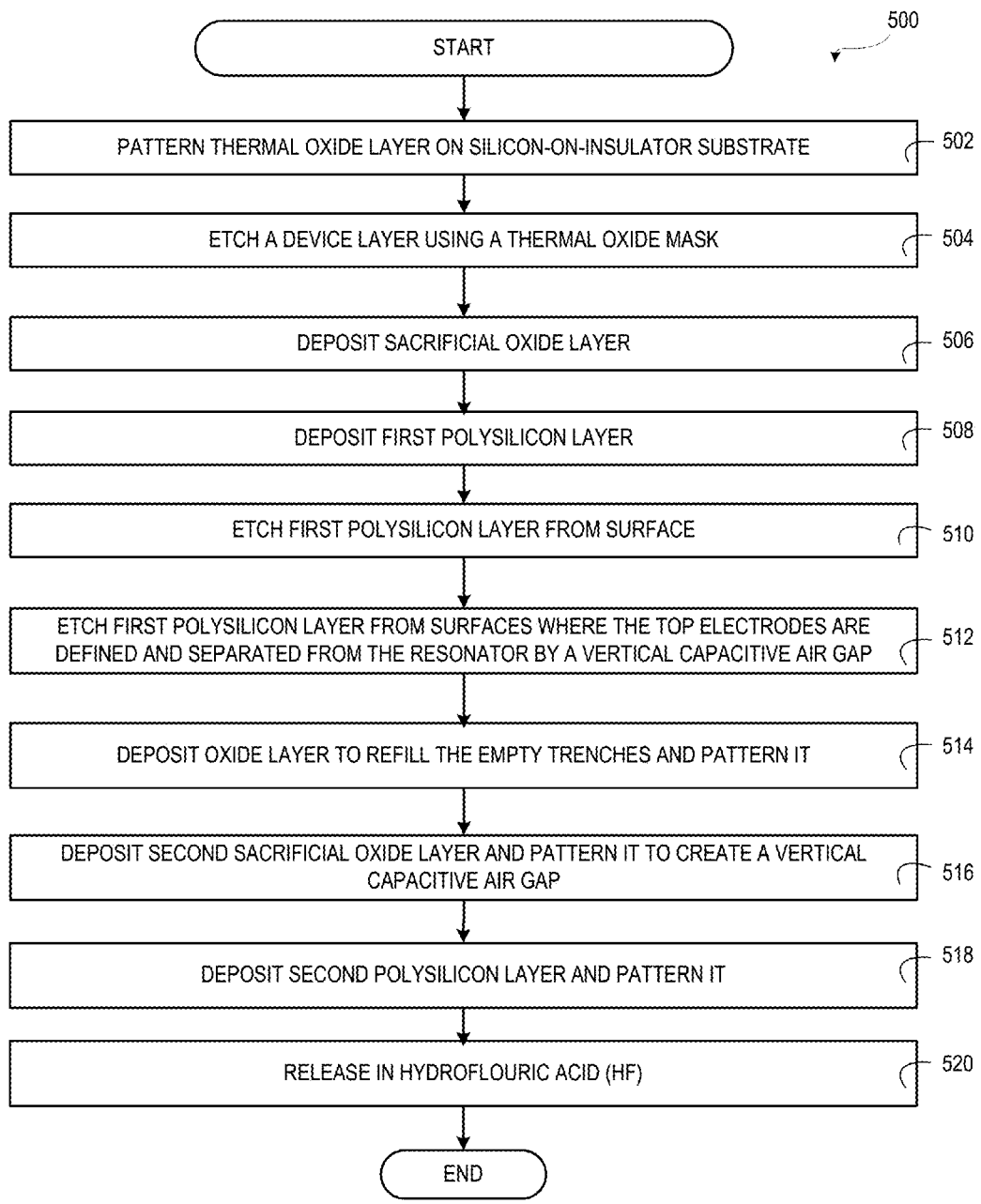
FIG. 5 is a flow diagram illustrating the process of fabricating a dual-axis annulus gyroscope as shown in FIGS. 3A and 3B and FIGS. 4A-D according to various embodiments of the present disclosure.

FIG. 5 illustrates a process of fabricating a single proof-mass dual-axis gyroscope as shown in FIGS. 3A and 3B and FIGS. 4A-D in accordance with embodiments of the present disclosure. A routine 500 begins at operation 502, where a thermal oxide layer 412 is patterned on the Silicon-on-Insulator (SOI) substrate 410. From operation 502, the routine 500 proceeds to operation 504, where the second silicon layer 406 is etched using a thermal oxide mask. From operation 504, the routine 500 proceeds to operation 506, where a sacrificial oxide layer 308 is deposited, as shown in FIG. 4A.

From operation 506, the routine 500 proceeds to operation 508, where a first polysilicon layer 420 is deposited within the trenches defined in the second silicon layer 406. From operation 508, the routine 500 proceeds to operation 510, where the first polysilicon layer 420 is etched from surfaces where the side electrodes are not being formed. From operation 510, the routine 500 proceeds to operation 512, where the first polysilicon layer 420 is etched from the surfaces where the top electrodes, such as the electrodes 122, 124, 126, 128, 132, 134, 136 and 138, are to be defined. This includes the trenches associated with the top electrodes as well as any surfaces 434 of the resonator 102 with which the top electrodes are to be separated by the vertical capacitive air gap 320, as shown in FIG. 4C.

From operation 512, the routine 500 proceeds to operation 514, where an oxide layer 430 is deposited to refill the empty trenches and holes. In some embodiments, the oxide layer 430 is a 3 µm thick LPCVD oxide layer 430. From operation 514, the routine 500 proceeds to operation 516, where a second sacrificial oxide layer 440 is deposited on the surfaces 104 of the resonator 102 with which the top electrodes, such as top electrode 122, are to be separated by the vertical capacitive air gap 320. From operation 516, the routine 500 proceeds to operation 518, where a second polysilicon layer 450 is deposited to form the top electrodes 122. In some embodiments, the second polysilicon layer 450 may be boron-doped, annealed and patterned to finalize the structure. From operation 518, the routine 500 proceeds to operation 520, where the structure may be exposed to Hydrofluoric Acid (HF), or any other oxide removing substance, under timed control, leaving a relatively small vertical capacitive air gap 320 between the top electrode 122 and the top surface 104 of the resonator 102 and a relatively small lateral capacitive air gap between the side electrode 112 and the side surface 106 of the resonator 102, as shown in FIGS. 3A and 3B. From operation 520, the routine 500 ends.

Figure 6:
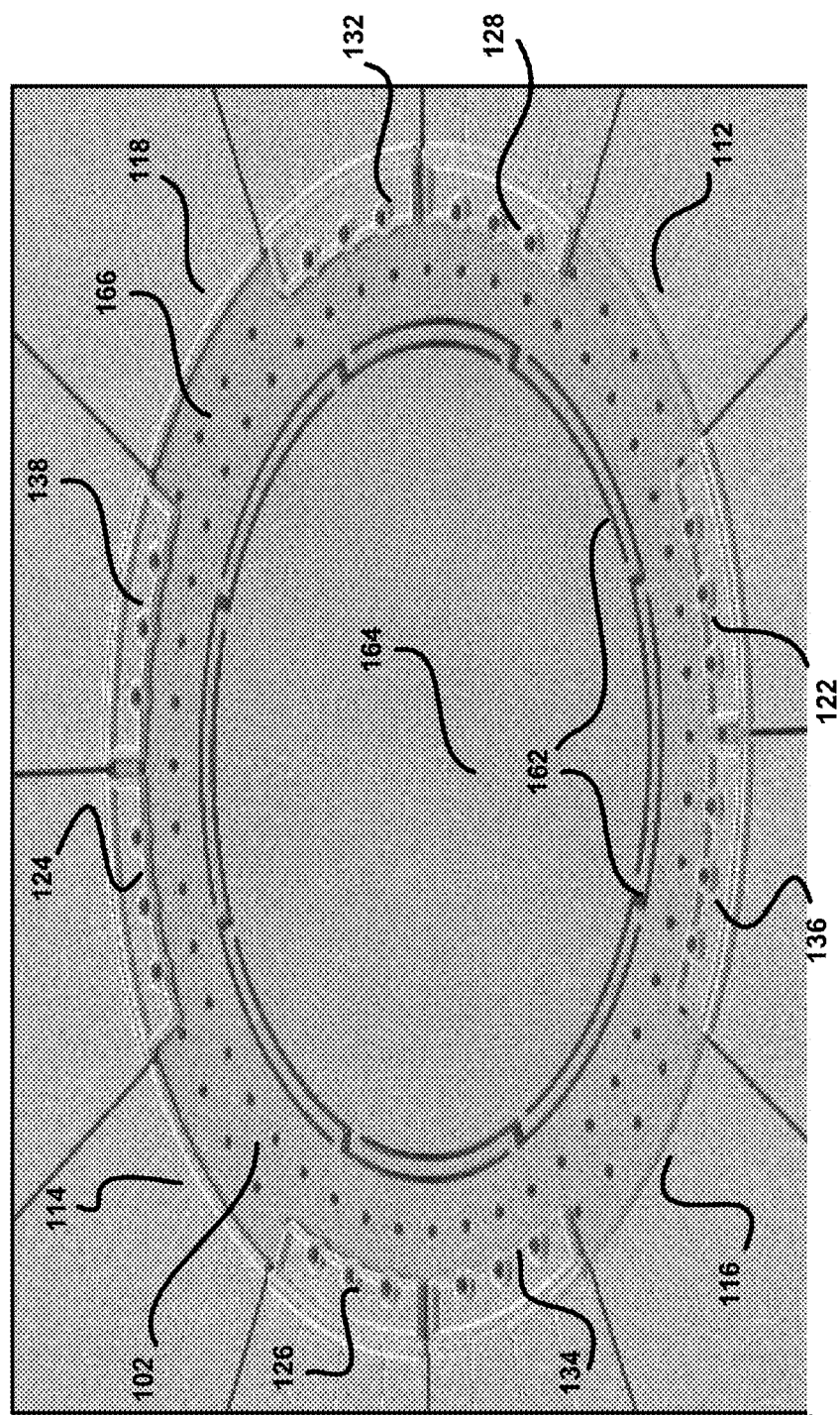
FIG. 6 is a SEM (Scanning Electron Microscope) image showing a top perspective view of a dual-axis gyroscope with release holes and a selectively-defined electrode area according to various embodiments of the present disclosure.
Figure 7A:
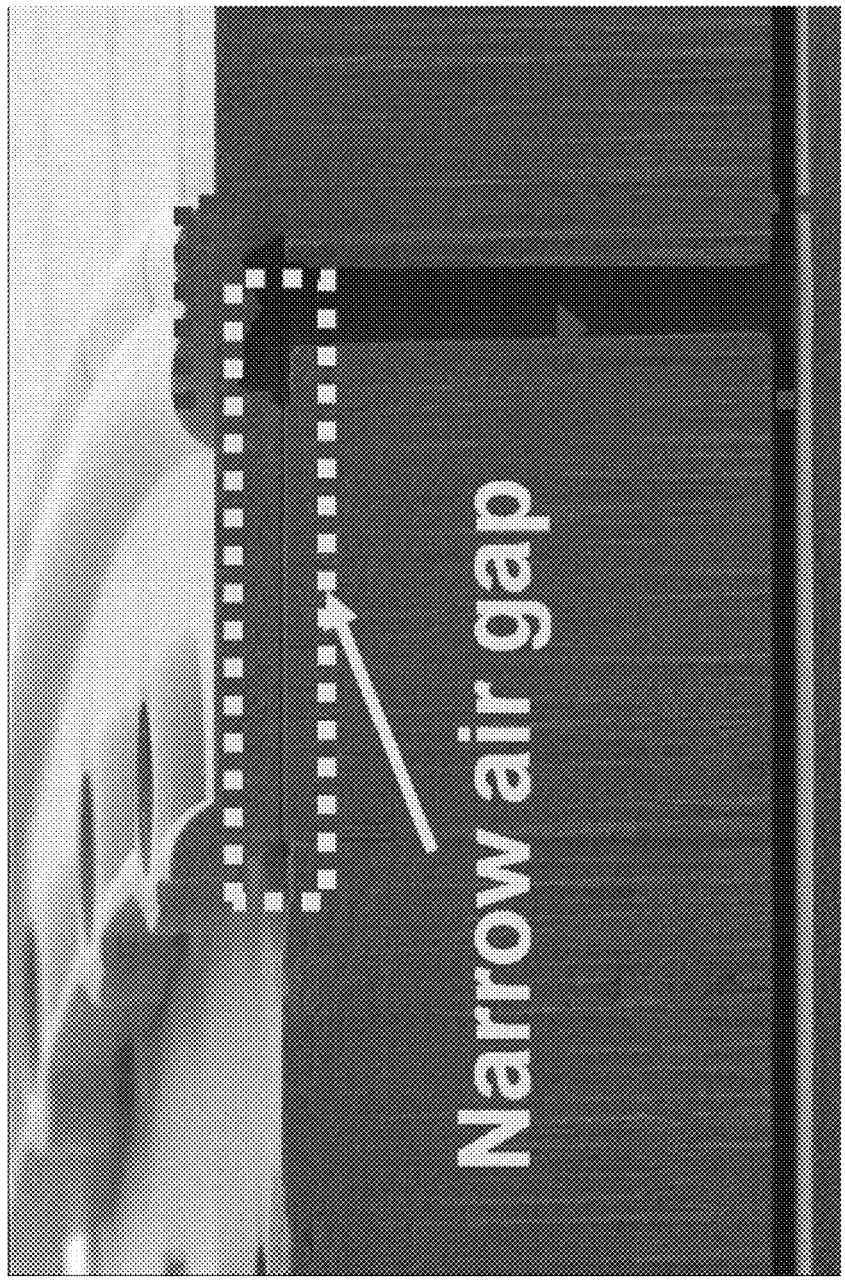
FIG. 7A is a cross-section of the vibrating mass of the dual-axis gyroscope and a top electrode according to various embodiments of the present disclosure.
Figure 7B:
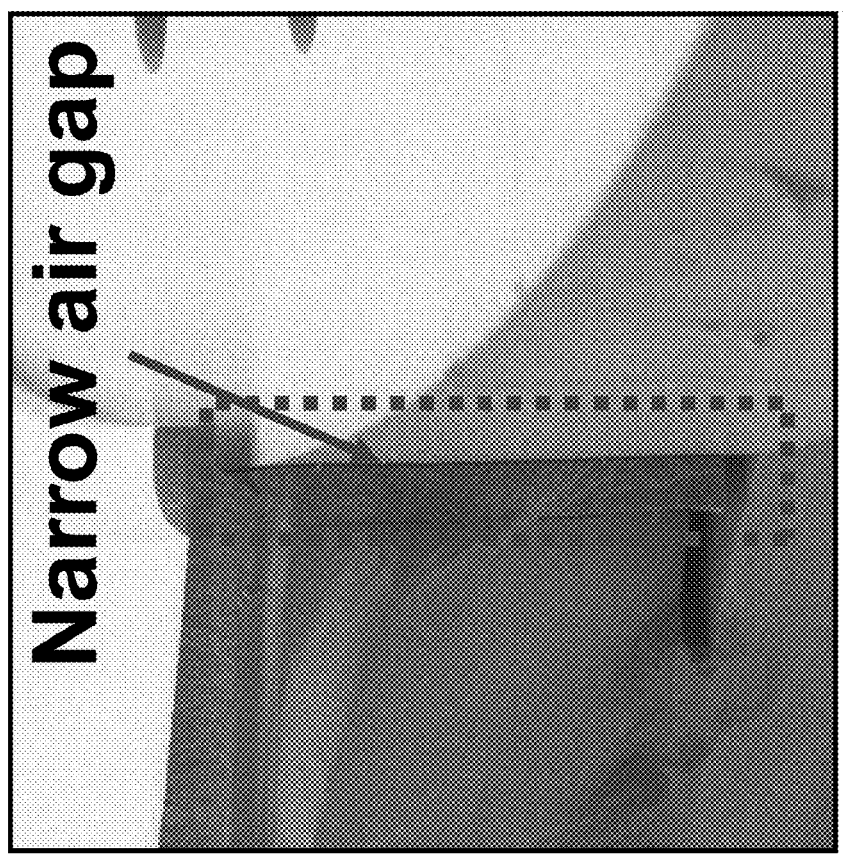
FIG. 7B is a cross-section of the vibrating mass of the dual-axis gyroscope and a side electrode according to various embodiments of the present disclosure.

Referring now to FIG. 6, an SEM images of the dual-axis gyroscope apparatus 100 with release holes and a selectively-defined electrode area is shown. As shown in FIG. 6, the resonator body 102 may have a plurality of interior springs 162, which couple an interior portion 164 of the resonator body to a more peripheral portion 166, thereof. FIG. 7A is a cross-section of the top electrode area and vibrating mass of the dual-axis gyroscope according to various embodiments of the present disclosure. FIG. 7B is a cross-section of the side electrode and the vibrating mass of the dual-axis gyroscope according to various embodiments of the present disclosure.

Figure 8:
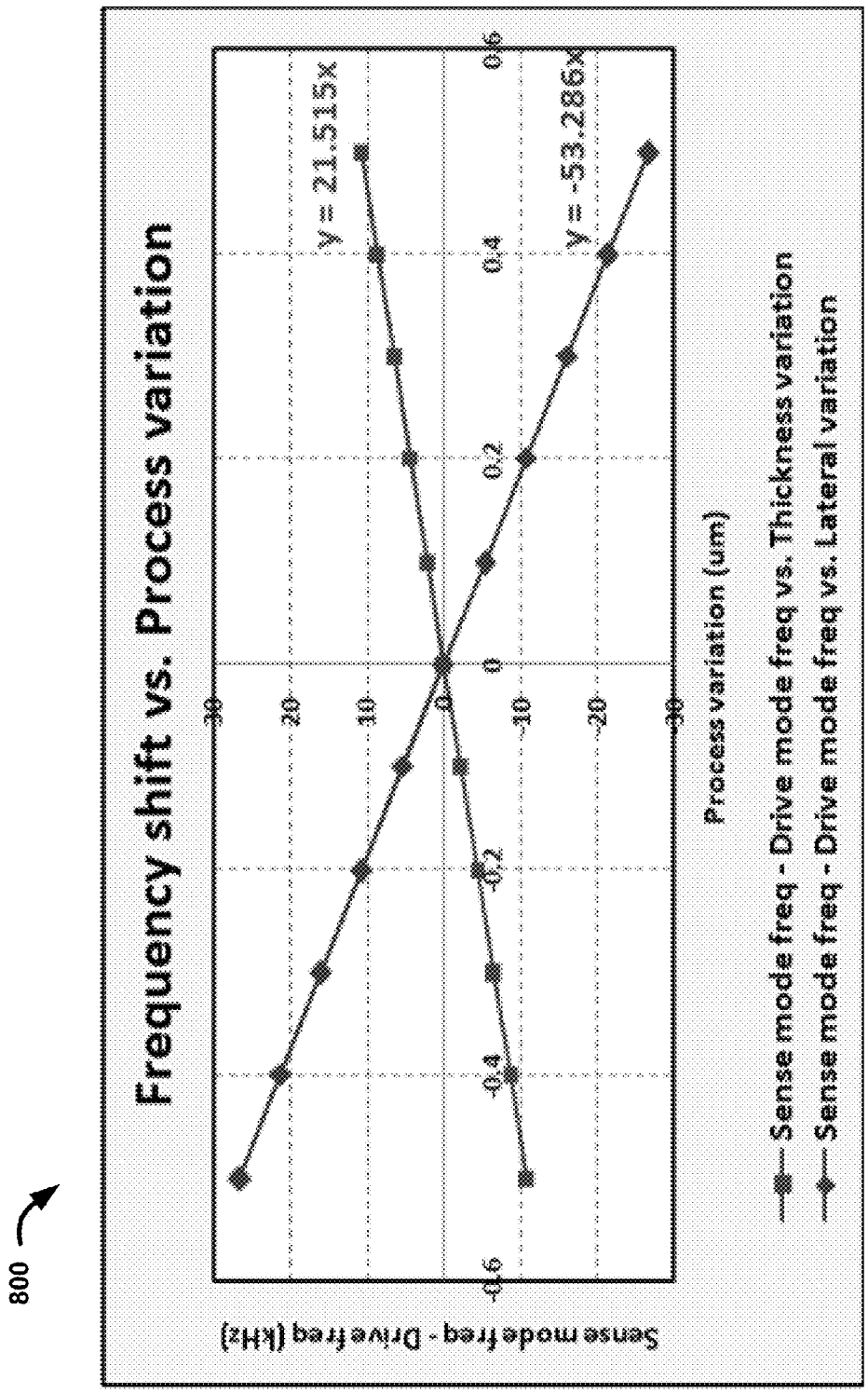
FIG. 8 is a graphical representation of an ANSYS simulation result for thickness and lateral dimension variation of a dual-axis annulus gyroscope according to various embodiments of the present disclosure.

FIG. 8 is a graphical representation of an ANSYS simulation result for thickness and lateral variation of the dual-axis annulus gyroscope according to various embodiments of the present disclosure. In order to predict drive and sense mode frequency shift under process variation, ANSYS simulations are performed using a process-biased model. Simulations of the frequency difference between out-of-plane sense modes and in-plane drive mode reveal +2.15 kHz/0.1 µm thickness variance and −5.33 kHz/0.1 µm lateral dimension variance, as shown in FIGS. 7A-B. Even though substrate thickness variation can be offset by giving lateral bias as shown in the plot 800, having a large electrostatic tuning opportunity is desirable for improving the manufacturing yield.

Figure 9:
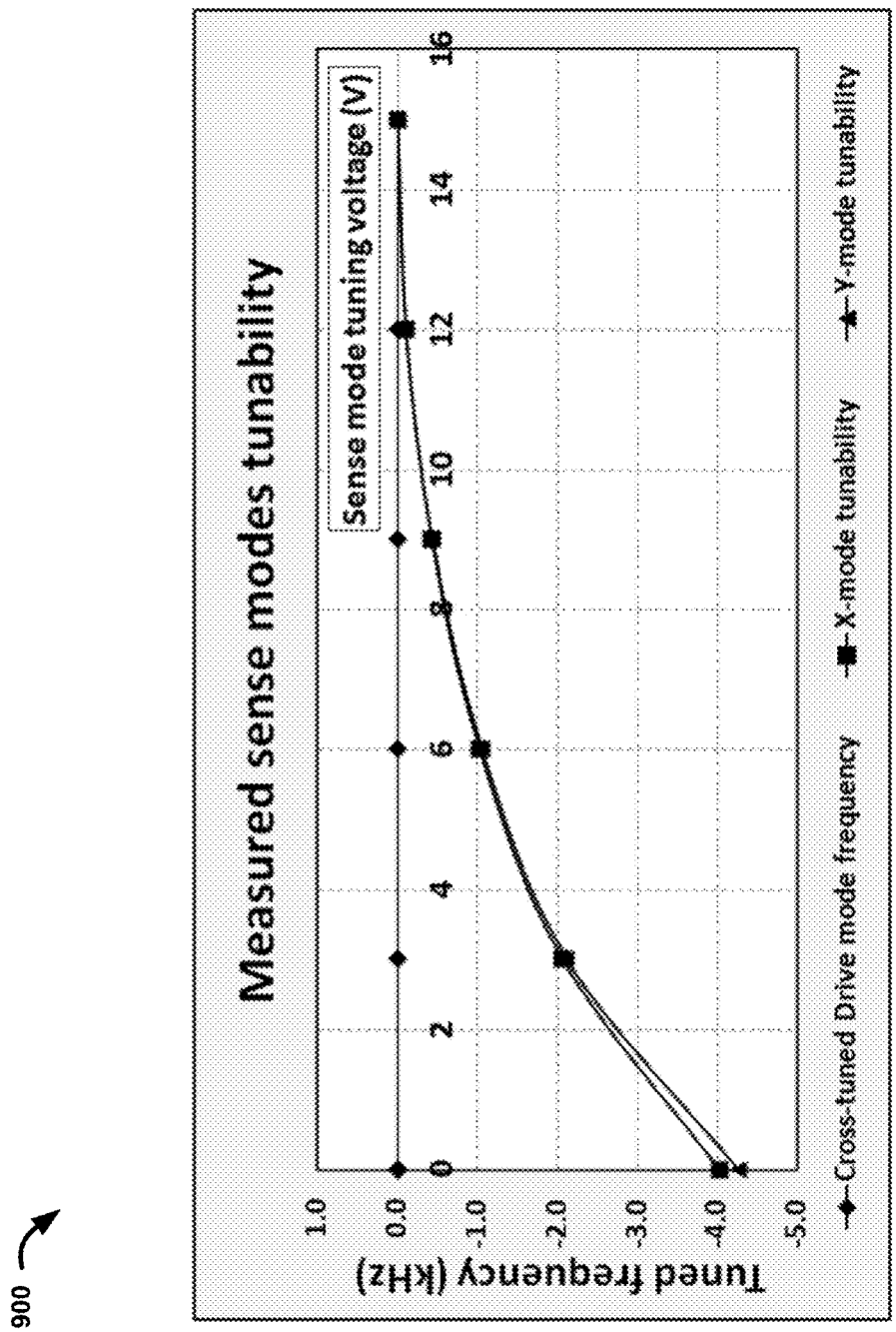
FIG. 9 is a graphical representation of a result for measured sense mode tunability of a dual-axis annulus gyroscope according to various embodiments of the present disclosure.

FIG. 9 is a graphical representation of results for measured sense mode tunability of the dual-axis annulus gyroscope 100 according to various embodiments of the present disclosure. FIG. 9 illustrates a plot 900 representing the measured frequency tunability of sense mode using applied DC voltages up to 15V. Sense mode frequency tunability of approximately 4 kHz can be observed by adjusting applied DC voltages to out-of-plane mode tuning electrodes 126, 128, 136, and 138.

Figure 10:
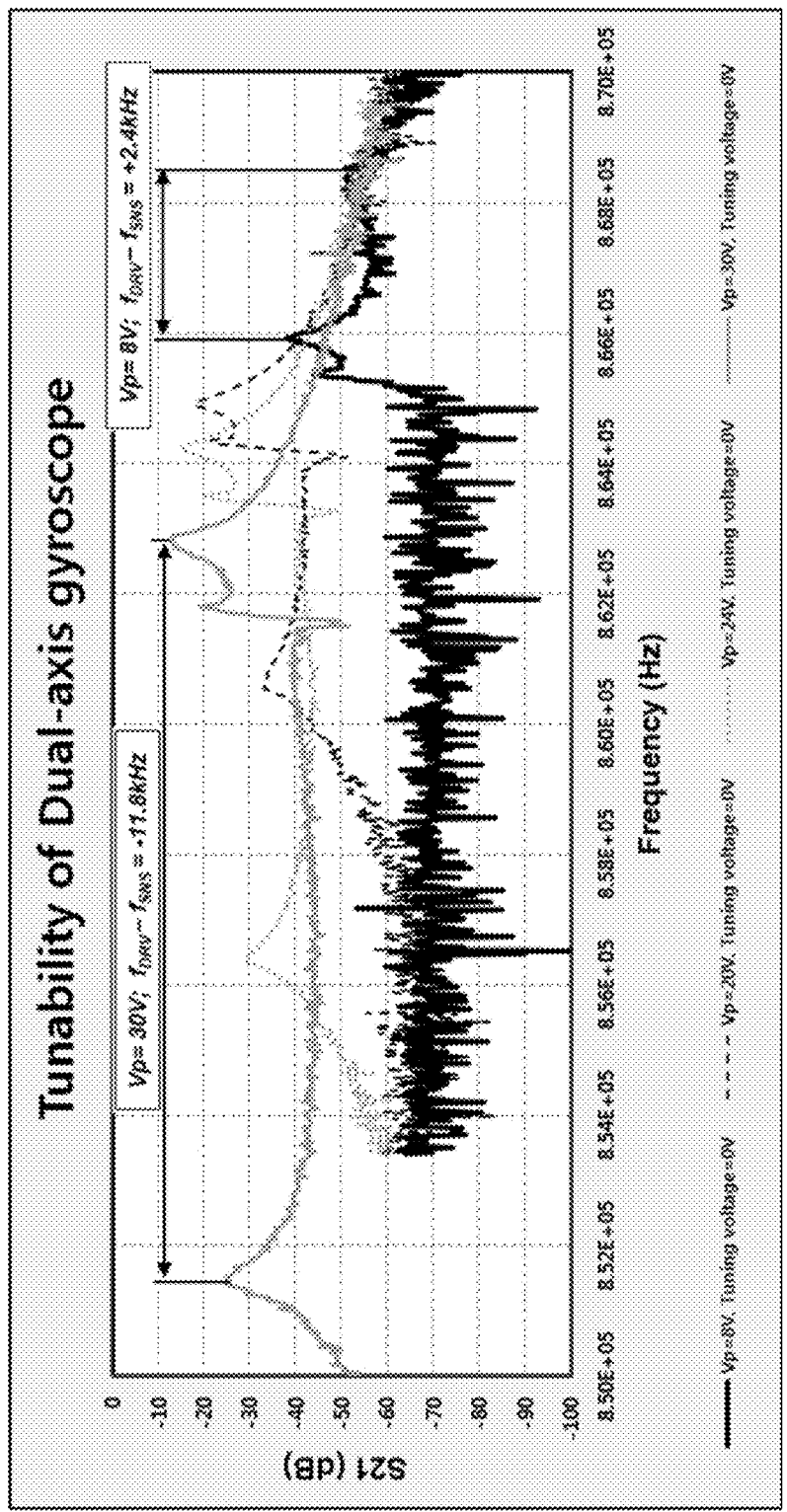
FIG. 10 is a graphical representation of result for measured drive mode tunability of a dual-axis annulus gyroscope according to various embodiments of the present disclosure.

FIG. 10 illustrates a plot representing the measured frequency tunability of drive mode using applied DC voltages up to 30V. Drive mode frequency tunability of approximately 14.2 kHz can be observed by grounding the drive tuning electrodes 116, 118 and simply increasing DC polarization voltage ($V_p$). The tuned frequency verifies mode-matched operation comparable to ±0.3 µm thickness variation during the fabrication process. Both in- and out-of-plane tuning behaviors exhibit large tunability with little cross-mode tuning.

Figure 11:
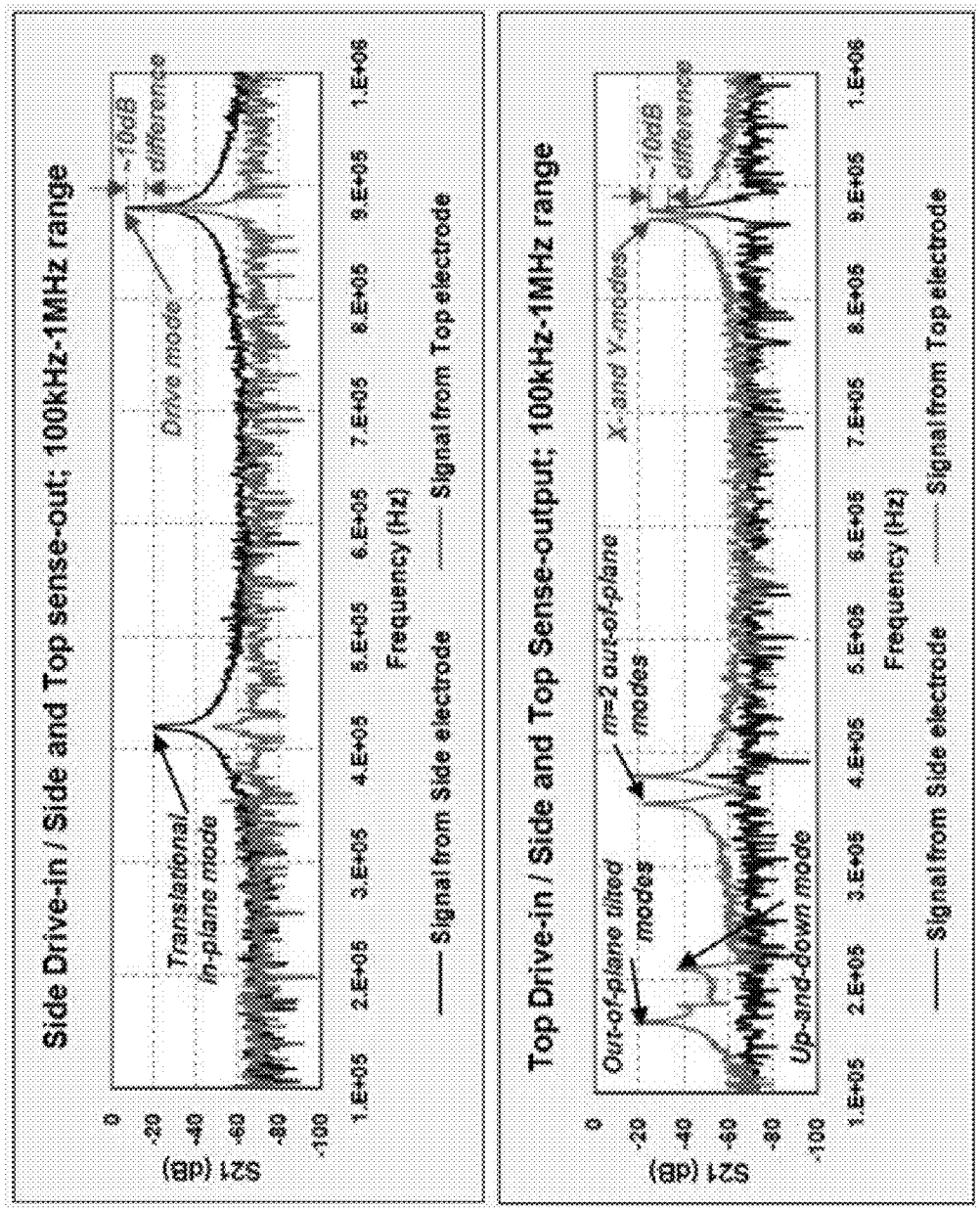
FIG. 11 is a graphical representation of result for measured significant signal strength differences from the side electrodes and top electrodes with the given in-plane and out-of-plane motion of the vibrating resonator according to various embodiments of the present disclosure.

Along with the 'nearly-independent' large frequency tunability, the selectively defined gap sizes result in significant signal strength differences between the side electrodes and top electrodes with the given in-plane and out-of-plane motion of the vibrating resonator 102 as shown in FIG. 11. When signal is driven from drive-in electrode 112, signal observed from sense electrodes 122, 124, 132, 134 exhibits more than 10 dB lower signal than from drive-out electrode 114. Similarly, when the device is actuated from one of sense electrode such as $\Omega_x^+$ electrode 124, signal observed from the side electrodes 112, 114 exhibits more than 10 dB lower signal than from the top electrodes 122, 132, 134.

Figure 12:
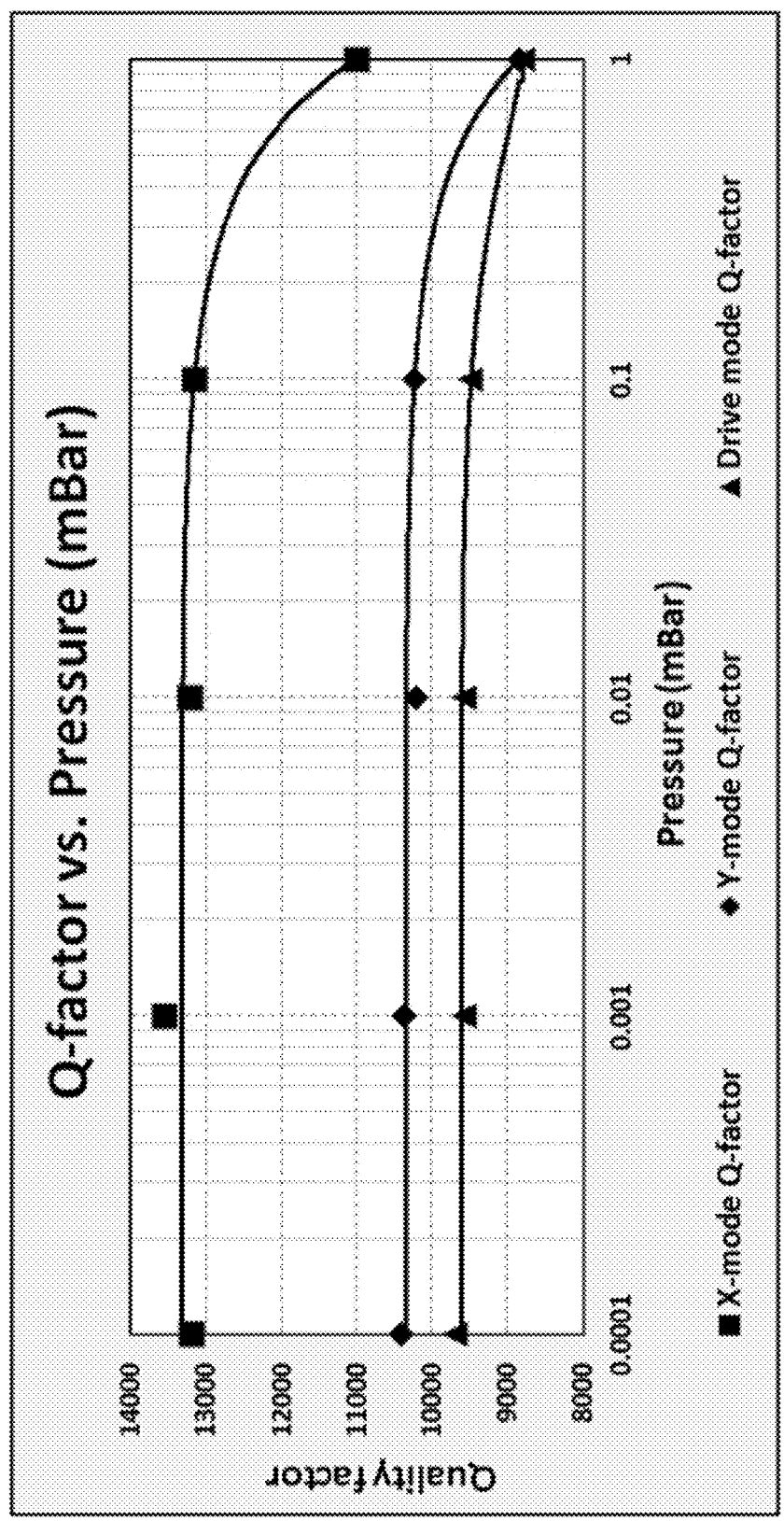
FIG. 12 is a graphical representation of measured results illustrating the relationship between the Q-factor and pressure according to various embodiments of the present disclosure; factor changes of 7.2%, 16.5%, and 15.12% for the Drive mode, x-axis mode, and y-axis mode, respectively as shown in FIG. 12.

In one embodiment, the quality factors for the drive, x- and y-axis modes can be approximately 9.7 k, 13 k and 10 k under split-mode conditions, respectively. Vacuum pressure was varied from 0.1 µBar to 1 mBar, resulting in Q factor changes of 7.2%, 16.5%, and 15.12% for the Drive mode, x-axis mode, and y-axis mode, respectively as shown in FIG. 12.

Figure 13A:
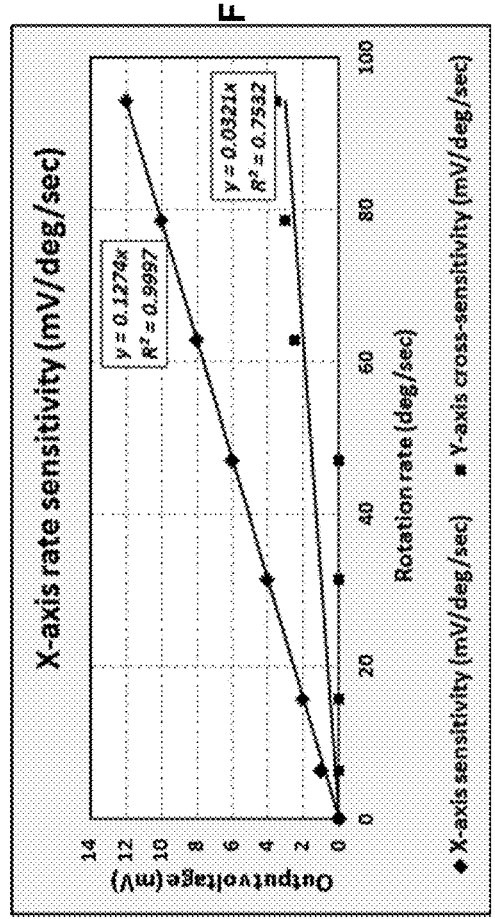
FIGS. 13A-B show graphs illustrating measured rate sensitivity of a dual-axis gyroscope according to various embodiments of the present disclosure.
Figure 13B:
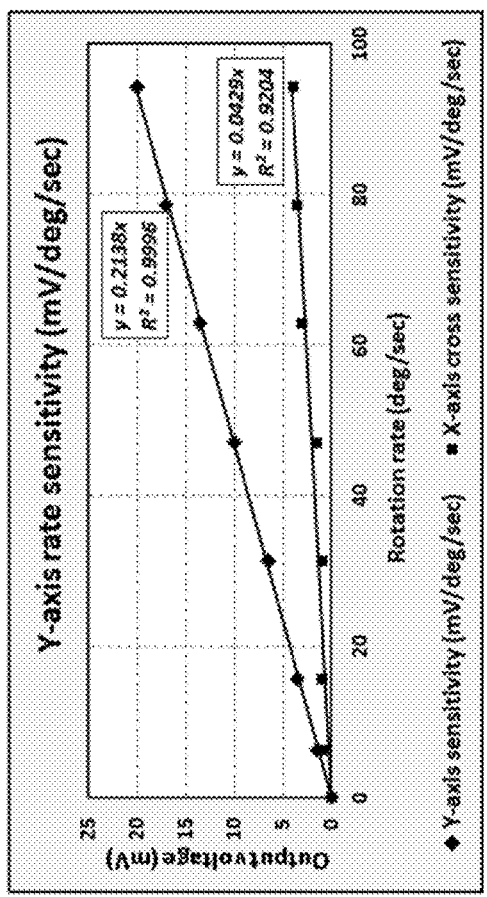

FIGS. 13A-B show graphs 1300A and 1300B illustrating measured rate sensitivity of an 800 µm diameter <100> Si dual-axis gyroscope according to various embodiments of the present disclosure. Scale factors for x-axis and y-axis rotation rate can be approximately 127.4 µV/deg/sec/electrode and 213.8 µV/deg/sec/electrode with cross-axis sensitivity of 25.2% and 20.1%, respectively. The cross-axis sensitivity can be reduced by employing quadrature cancellation electrodes to align the anti-nodes of sense modes to the anti-nodes of drive mode or by introducing calibration technique.

Figure 14:
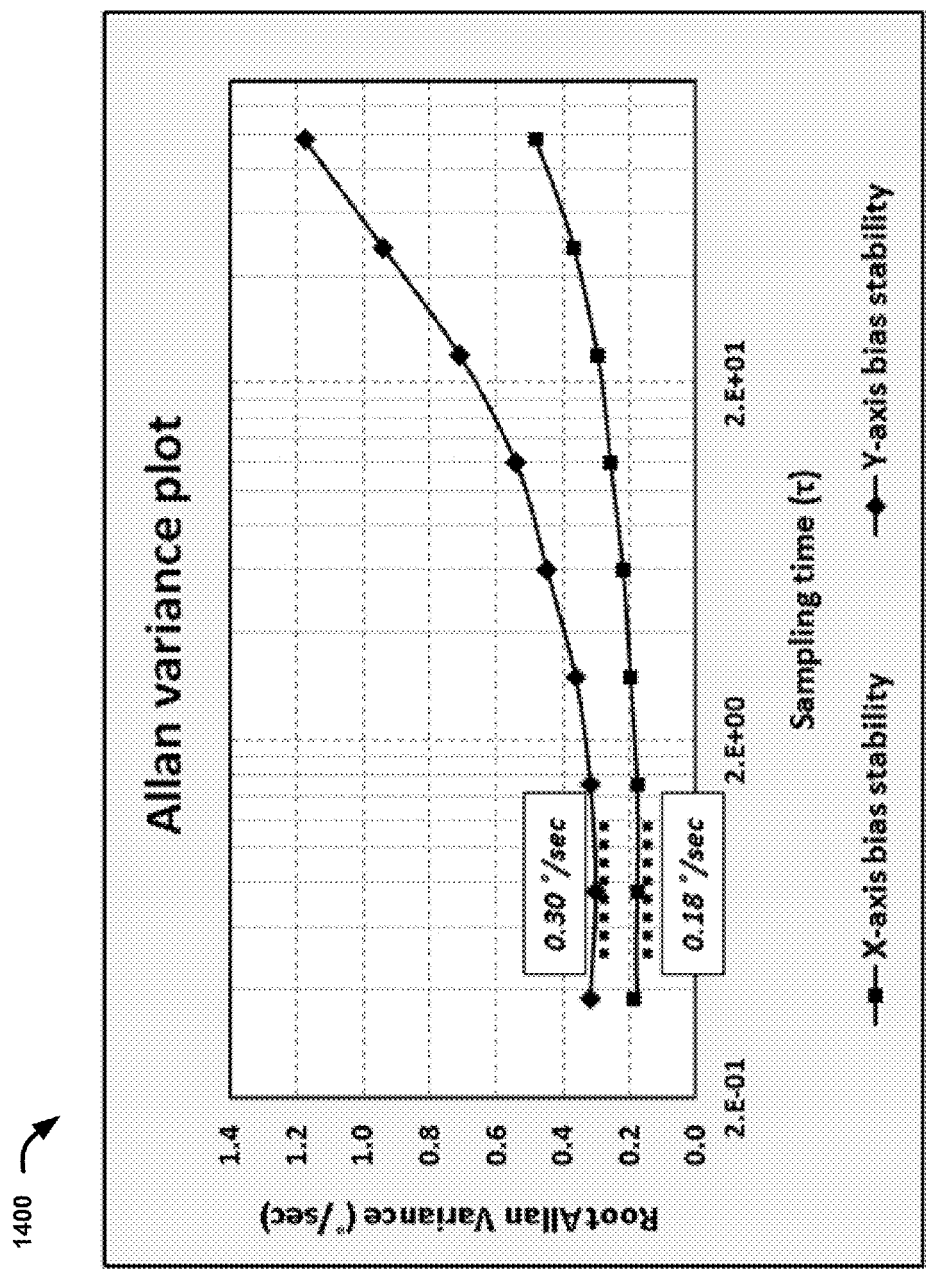
FIG. 14 shows a graph illustrating Allan variance measurement according to various embodiments of the present disclosure.

FIG. 14 shows a graph 1400 illustrating Allan variance measurement according to an embodiment of the present disclosure. The Allan variance measurements may show bias drift of approximately 0.18 deg/sec and 0.30 deg/sec for X-axis mode and Y-axis mode, respectively.

A 0.9 MHz single-proof-mass pitch-and-roll annulus gyroscope is presented. The high frequency device is designed and fabricated using an improved HARPSS process, which enables large frequency tunability and improves signal isolation between in-plane modes and out-of-plane modes of the gyroscope 100 by selectively defining vertical and lateral capacitive air gaps. In addition, the Quality factor of the gyroscope is relatively insensitive to pressure changes, such as within the range of 0.1 µBar to 1 mBar. This allows for low-cost packaging and stable device operation. Table 1 summarizes performance parameters of an exemplary annulus gyroscope 100 in accordance with the disclosure.

TABLE 1

Performance of measured dual-axis gyroscope

| Device parameter | Value |
| --- | --- |
| Operation frequency | 872 kHz (Measured) |
| | 898 kHz (ANSYS) |
| Device thickness | 40 μm |
| Capacitive air gap | 200 nm for horizontal transduction |
| | 300 nm for vertical transduction |
| Tunability | 14.2 kHz for drive mode |
| | 4 kHz for sense modes |
| Theoretical Brownian noise floor | 0.024 deg/sec/√Hz |
| Measured rate sensitivity | 127.4 μV/°/sec/electrode for X-mode |
| | 213.8 μV/°/sec/electrode for Y-mode |
| Allan bias stability | 0.18°/sec for X-mode |
| | 0.30°/sec for Y-mode |
| Measured quality factor | 9.7k, 13k, 10k for Drive, X- and Y-mode, respectively |

Figure 15A:
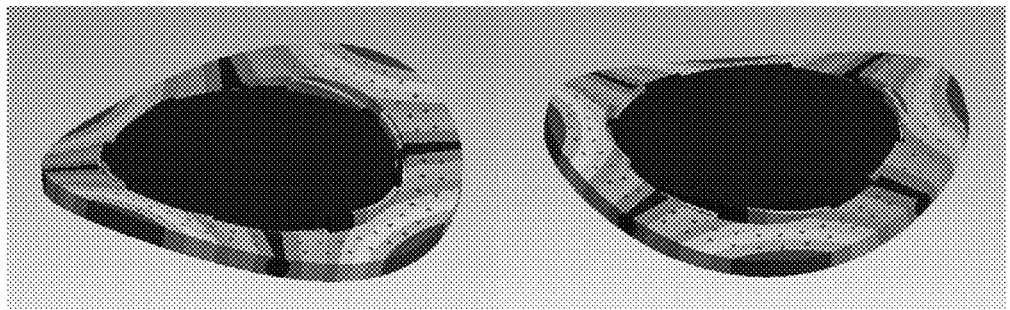
FIGS. 15A-G illustrate ANSYS simulation models of various exemplary resonant modes, with FIGS. 15A, 15B, 15C, and 15D are n=2, 3, 4, and 5 out-of-plane modes, respectively.
Figure 15B:
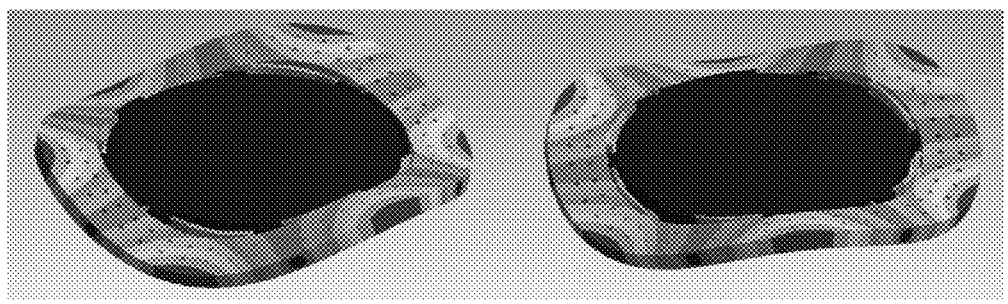
Figure 15C:
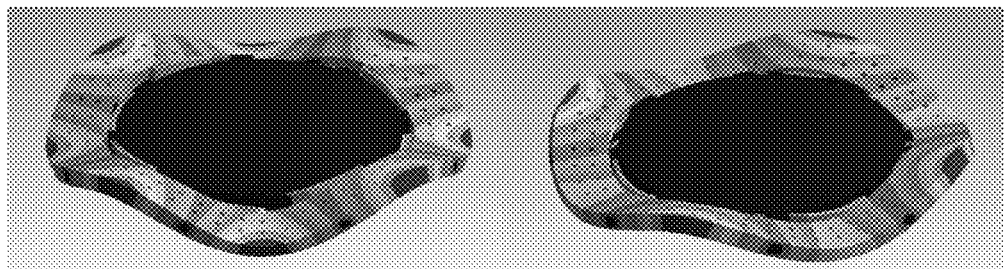
Figure 15D:
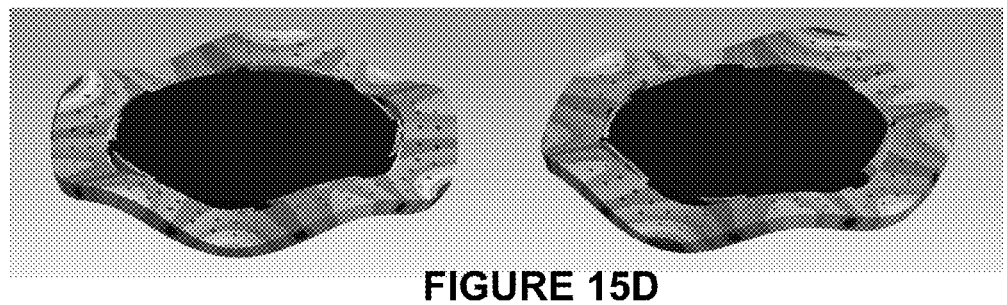
Figure 15E:
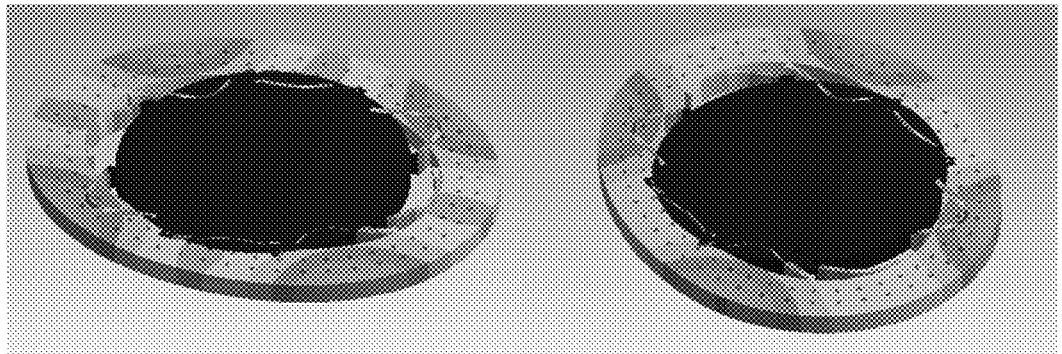
Figure 15F:
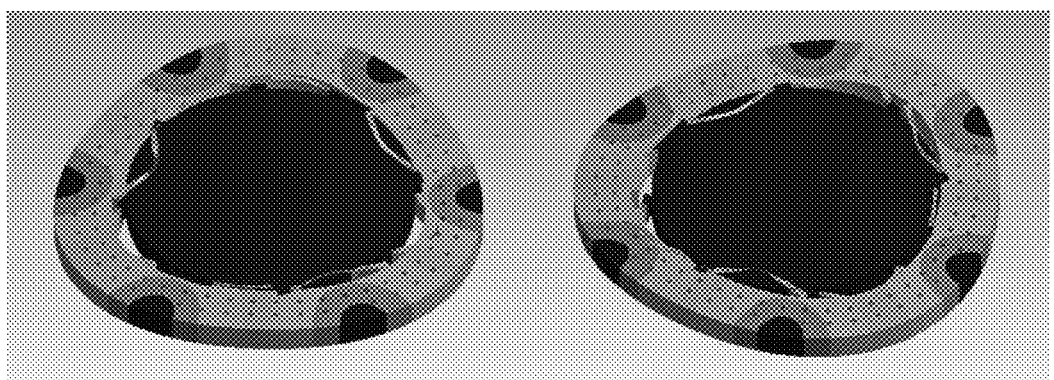
Figure 15G:
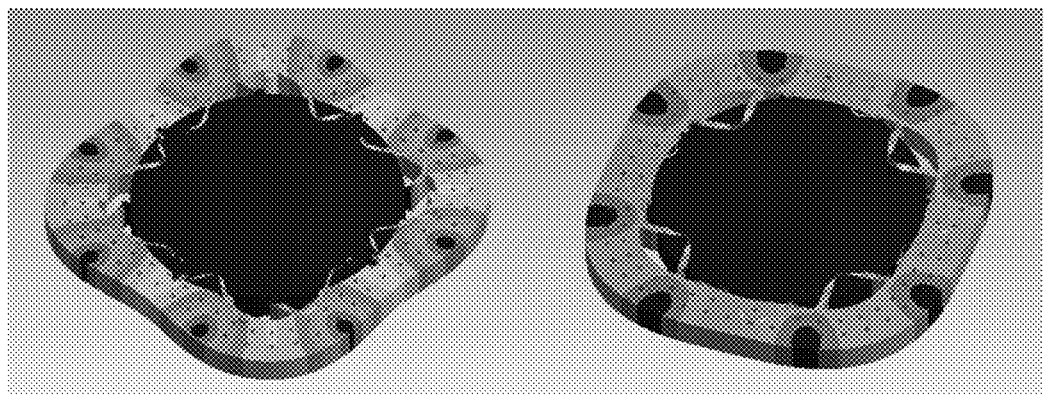

The resonating body 102 be operated by the following combinations among various resonant modes of operation; m=n±1, where m=mode number of in-plane mode and n=mode number of out-of-plane mode. For example, in-plane driving mode shown in FIG. 15F has capability of being utilized with FIG. 15A or FIG. 15C. In addition, in-plane driving mode shown in FIG. 15G has capability of being utilized with FIG. 15B or FIG. 15D. The device can be driven by in-plane mode and sensed by out-of-plane mode, vice versa.

By way of the present disclosure, it should be apparent to those skilled in the art that a single proof-mass, dual-axis gyroscope can be operated for angular-rate measurement and direct-angle readouts (whole angle mode) with respect to axis of pitch-and-roll. In addition, the gyroscope can be used for simultaneous pitch-and-roll angular-rate and angle measurement and also capable of single-axis pitch-or-roll angular-rate and angle measurement by locating one of out-of-plane sense frequencies apart from the other mode-matched frequencies.

The present disclosure is illustratively described above in reference to the disclosed embodiments. Various modifications and changes may be made to the disclosed embodiments by persons skilled in the art without departing from the scope of the present disclosure as defined in the appended claims.

What is claimed is:

1. A single proof-mass, dual-axis gyroscope apparatus comprising:
    a resonating body member having a top surface and a side surface substantially perpendicular to the top surface; and
    first and second electrodes capacitively coupled to the resonating body member, each electrode having a first portion disposed substantially parallel to the body member side surface and spaced therefrom by a respective lateral capacitive dielectric gap and a second portion disposed substantially parallel to the body member top surface and spaced therefrom by a respective vertical capacitive dielectric gap,
    wherein one of the lateral capacitive dielectric gap or the vertical capacitive dielectric gap of the first electrode is substantially smaller than the corresponding dielectric gap of the second electrode when the resonating body member is in a rest position.

2. The apparatus of claim 1, wherein the resonating body member is connected to a central structure.

3. The apparatus of claim 2, wherein the resonating body member is supported by at least one support member connecting the resonating body member to the central structure.

4. The apparatus of claim 1, wherein the resonating body member is an annulus.

5. The apparatus of claim 1, wherein the resonating body member is a polygon.

6. The apparatus of claim 1, wherein the first electrode lateral capacitive dielectric gap is substantially smaller than the first electrode vertical capacitive dielectric gap, and wherein the second electrode vertical capacitive dielectric gap is substantially smaller than the second electrode lateral capacitive dielectric gap.

7. The apparatus of claim 1, wherein at least one of the lateral capacitive dielectric gaps and the vertical capacitive dielectric gaps is made from a non-conductive material.

8. The apparatus of claim 1, wherein the first electrode is a drive electrode and the second electrode is a sense electrode.

9. The apparatus of claim 1, wherein the apparatus is configured to utilize an in-plane drive mode, a first orthogonal out-of-plane sense mode orthogonal to the in-plane drive mode, and a second orthogonal out-of-plane sense mode orthogonal to the first orthogonal out-of-plane sense mode and the in-plane drive mode.

10. The apparatus of claim 9, wherein the second electrode comprises four sense electrodes defined on top of anti-nodes of out-of-plane modes.

11. The apparatus of claim 10, wherein the in-plane drive mode has anti-nodes aligned with the anti-nodes of out-of-plane modes.

12. The apparatus of claim 11, wherein the anti-nodes of a first out-of-plane mode are aligned with nodes of a second out-of-plane mode and the anti-nodes of the second out-of-plane mode are aligned with the nodes of the first out-of-plane mode.

13. The apparatus of claim 12, wherein a frequency of the in-plane drive mode, a frequency of a first orthogonal out-of-plane sense mode, and a frequency of a second orthogonal out-of-plane sense are mode-matched.

14. The apparatus of claim 13, wherein the resonating body is operated at a mode-matched condition in which the resonance frequencies for an in-plane drive mode and two out-of-plane sense modes are located at a specific frequency.

15. The apparatus of claim 13, wherein the resonating body is operated at a near mode-matched condition in which the resonance frequencies for an in-plane drive mode and two out-of-plane sense modes are located in a bandwidth range of approximately 3 dB within a specific frequency range of operation.

16. The apparatus of claim 9, further comprising an in-plane frequency tuning electrode located at an anti-node of the in-plane drive mode.

17. The apparatus of claim 9, further comprising four out-of-plane frequency tuning electrodes separated from one another by approximately 90 degrees disposed about a periphery of the resonating body member.

18. The apparatus of claim 6, wherein the first electrode lateral capacitive dielectric gap is approximately 200 nm.

19. The apparatus of claim 6, wherein the second electro Previously presented de lateral capacitive dielectric gap is approximately 300 nm.

20. The apparatus of claim 6, wherein each of the first electrode vertical capacitive dielectric gap and the second electrode lateral capacitive dielectric gap is approximately 5 μm.

21. The apparatus of claim 1, further comprising quadrature cancellation electrodes.

22. The apparatus of claim 1, wherein the resonating body member is made from an anisotropic substrate.

23. The apparatus of claim 22, wherein the first electrode is located in at least one of a <100> and a <110> direction of the anisotropic substrate.

24. The apparatus of claim 1, wherein the resonating body member is made from an isotropic substrate.

25. The apparatus of claim 6, wherein the first electrode configured to actuate the resonating body is located in at least one of a <100> and a <110> direction of the isotropic substrate when utilized by a <100> silicon substrate.

26. The apparatus of claim 1, wherein the resonating body comprises at least one piezoelectric layer configured to excite and sense resonance modes of the resonating body.

27. The apparatus of claim 26, wherein the at least one piezoelectric layer is attached to the top surface of at least one of the resonating body and support structures supporting the resonating body.

28. The apparatus of claim 1, further comprising at least one frequency tuning electrode, the frequency tuning electrode configured to substantially mode-match the resonating body member.

29. The apparatus of claim 28, wherein the frequency tuning electrode is separated from an anti-node of an in-plane driving mode of the resonating body member by a respective capacitive dielectric gap.

30. The apparatus of claim 29, wherein the frequency tuning electrode is separated from an anti-node of an out-of-plane mode of the resonating body by a respective capacitive dielectric gap.

31. The apparatus of claim 1, wherein the capacitive dielectric gaps comprise air.

32. A single proof-mass dual-axis gyroscope apparatus comprising:
a resonating body member; and
a plurality of electrodes each capacitively coupled to, and spaced from, the resonating body member by a lateral capacitive dielectric gap and a vertical capacitive dielectric gap arranged substantially perpendicular to the lateral capacitive dielectric gap,
wherein a width of at least one of the dielectric gaps capacitively coupling a first electrode of the plurality of electrodes to the resonating body member is substantially smaller than a corresponding dielectric gap capacitively coupling a second electrode of the plurality of electrodes to the resonating body member when the resonating body member is in a rest position.

33. The apparatus of claim 32, wherein the lateral capacitive dielectric gap of one of said plurality of electrodes is substantially smaller than the lateral capacitive dielectric gap of another one of said plurality of electrodes.

34. The apparatus of claim 32, wherein the vertical capacitive dielectric gap of one of said plurality of electrodes is substantially smaller than the vertical capacitive dielectric gap of another one of said plurality of electrodes.

35. The apparatus of claim 32, wherein the vertical capacitive dielectric gap of one of said plurality of electrodes is substantially dissimilar to the vertical capacitive dielectric gap of another one of said plurality of electrodes.

36. A method of fabricating a single proof-mass dual-axis gyroscope apparatus comprising:
A) forming a resonating body member having a top surface and a side surface substantially perpendicular to the top surface;
B) forming a side electrode separated from the side surface of the resonating body member by a first lateral capacitive dielectric gap substantially smaller than a first vertical capacitive dielectric gap separating the side electrode from the top surface of the resonating body member;
C) forming a top electrode separated from the top surface of the resonating body member by a second vertical capacitive dielectric gap substantially smaller than a second lateral capacitive dielectric gap separating the top electrode from the side surface of the resonating body member; and
D) forming the side and top electrodes such that the first lateral capacitive dielectric gap is substantially smaller than the second lateral capacitive dielectric gap when the resonating body member is in a rest position.

37. A gyroscope apparatus comprising:
a resonating body member having a top surface and a side surface substantially perpendicular to the top surface;
a first electrode, capacitively coupled to the resonating body member, having a first portion disposed substantially parallel to the resonating body member side surface and spaced therefrom by a respective first lateral capacitive dielectric gap and a second portion disposed substantially parallel to the resonating body member top surface and spaced therefrom by a respective first vertical capacitive dielectric gap; and
a second electrode, capacitively coupled to the resonating body member, having a first portion disposed substantially parallel to the resonating body member side surface and spaced therefrom by a respective second lateral capacitive dielectric gap and a second portion disposed substantially parallel to the resonating body member top surface and spaced therefrom by a respective second vertical capacitive dielectric gap,
wherein one of the first lateral or vertical capacitive dielectric gaps of the first electrode is substantially smaller than the corresponding gap of the second electrode when the resonating body member is in a rest position.

* * * * *

UNITED STATES PATENT AND TRADEMARK OFFICE
CERTIFICATE OF CORRECTION

PATENT NO. : 9,726,489 B2
APPLICATION NO. : 13/991672
DATED : August 8, 2017
INVENTOR(S) : Farrokh Ayazi et al.

Page 1 of 1

It is certified that error appears in the above-identified patent and that said Letters Patent is hereby corrected as shown below:

In the Claims

Column 12, Line 62 Claim 19, "The apparatus of claim 6, wherein the second electro Previously presented de lateral capacitive dielectric gap is approximately 300 nm." should read -- The apparatus of claim 6, wherein the second electro de lateral capacitive dielectric gap is approximately 300 nm. --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*